United States Patent Office 3,376,950
Patented Apr. 9, 1968

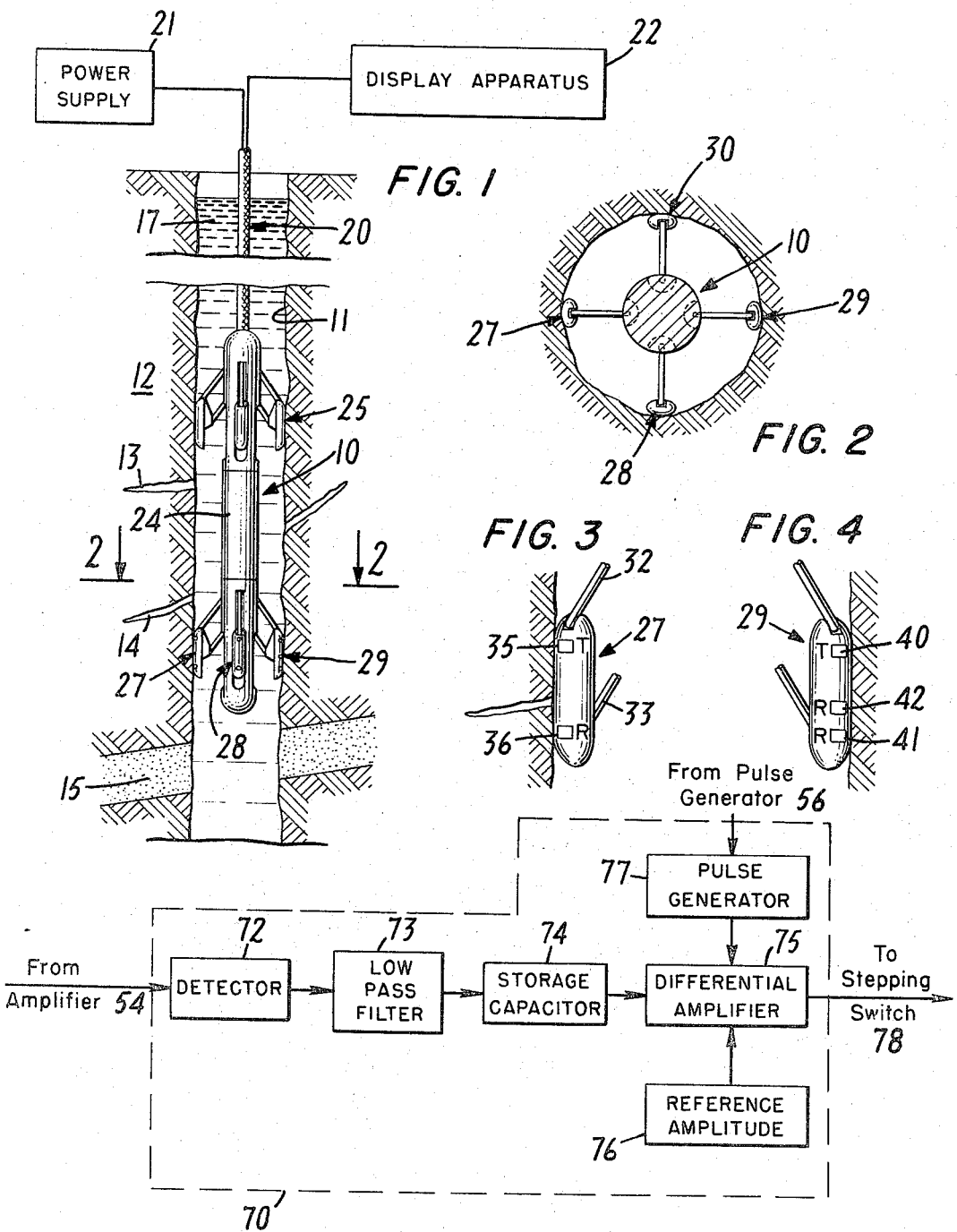

3,376,950
ACOUSTICAL WELL LOGGING METHODS AND APPARATUS FOR DETERMINING THE DIP AND OTHER CHARACTERISTICS OF EARTH FORMATIONS TRAVERSED BY A BOREHOLE
Donald R. Grine, Redding, Conn., assignor, by mesne assignments, to Schlumberger Technology Corporation, Houston, Tex., a corporation of Texas
Filed Sept. 3, 1965, Ser. No. 484,926
6 Claims. (Cl. 181—.5)

ABSTRACT OF THE DISCLOSURE

An acoustical well logging system for determining the dip and/or other characteristics of earth formations traversed by a borehole by disposing at least three pairs of electroacoustical transducers against the borehole wall in laterally mutually spaced relation, pulsing one of each pair of transducers with electrical energy to transmit pulses of acoustic energy from the borehole into the formation, generating electrical signals by the other of each pair of transducers in response to the acoustic energy received in the borehole through the formation from the corresponding one of each pair, determining the transmission times of the acoustic energy pulses between the one and the other of each pair of transducers and/or the attenuation suffered by the acoustic energy pulses in the formation adjacent each pair of transducers, and correlating the transmission times and/or the attenuations.

---

This invention relates to methods and apparatus for investigating earth formations traversed by a borehole and, more particularly, to improved methods and apparatus employing acoustic energy for making dip measurements in the formations while at the same time obtaining more precise information concerning the acoustic properties of the formations than are obtainable with known prior art acoustic logging systems and techniques.

It is well known in the art to use well logging equipment known as a dipmeter for determining the angle and azimuthal direction of the dip of earth strata traversed by a borehole. Such dipmeters provide three electrode systems mutually spaced at 120 degree intervals in a plane perpendicular to the axis of the instrument which provide three logs as the instrument travels through the borehole of the resistivity of the surrounding formation. The Henri-Georges Doll Patent No. 2,427,950, which issued Sept. 23, 1947, discloses such a prior art dipmeter. A comparison of the three electrical logs permits one to estimate the disposition of the formation with respect to the logging tool, and suitable inclinometer apparatus discloses the attitude of the logging tool with respect to the vertical and to magnetic north.

There are several disadvantages to conventional resistivity dipmeters. It is apparent that such a resistivity or conductivity tool requires a well bore filled with a water base drilling mud, and so dipmeter logs cannot be run in empty holes or in a bore filled with an oil base mud. Also, such prior art dipmeters cannot detect very thin beds, since the extent to which the electrode system can be focused into the formation is limited. In addition, it is often difficult to determine whether fluctuations in the resistivity logs are caused by a bed boundary or a relatively thin stratum, or whether it is merely caused by irregularities in the borehole wall. Moreover, prior art dipmeters are essentially single-purpose tools and require a separate logging run.

A conventional acoustic well logging tool or sonde is generally cylindrically shaped and of suitable diameter for passage through a well bore which is filled with a water base or an oil base drilling mud. Suitable centering members are provided for maintaining the tool substantially in the center of the borehole, and two or more electroacoustic transducers are disposed in spaced longitudinal relation along one side of the sonde, one of the transducers being suitably driven to transmit pulses of acoustic energy. The transmitted pulses of interest travel from the transmitter through the drilling mud to the wall of the borehole where some of the energy is refracted and passes through the formation along the borehole wall, and is then again refracted and passes back through the drilling mud to the other transducers, which produce electrical signals in response to the acoustic energy received thereby. Appropriate electrical circuitry is provided for determining the attenuation and the travel time of the acoustical signal in its travel between the transmitter and one receiver or between two receivers.

As is well known, the velocity and attenuation of an acoustic impulse travelling through an earth formation are indicative of parameters of this formation which may be interpreted by those skilled in the art to estimate the recoverability of hydrocarbons (such as oil and gas) in the formation. Known acoustic logging systems are capable of providing a great deal of useful information about the formations, but nevertheless, have some limitations. For example, inasmuch as the transducers are maintained at a substantial distance from the borehole wall by the centering apparatus on the sonde, the minimum spacing between these transducers must be substantial, e.g., on the order of one foot or more in order to insure that the acoustic wave which is refracted through the formation arrives at the receiver before those which travel through the drilling mud or through the thick mud cake along the borehole wall. These conditions impose an upper frequency limit to the acoustic waves that may be used without excessive attenuation, and so the typical operating frequency for conventional acoustic logging tools is between approximately 10 to 30 kilocycles per second. It is apparent that by so limiting the operating frequency, the resolution of very thin beds or fractures is correspondingly limited. For example, if the width of a fracture is very small compared to the wave length of an acoustic wave transmitted thereacross, there will be slight attenuation of the acoustic wave by this fracture, inasmuch as the reflected wave from the fracture is essentially cancelled due to interference.

Furthermore, the disposition of the transducers within the borehole at a substantial lateral distance from the wall thereof permits the acoustic energy to follow multiple paths from the transmitter to a given receiver, for example along opposite sides of the borehole wall. The length of some of these paths will be of comparable magnitude, so that the composite signal received at a receiver often masks the individual signals due to the acoustic waves travelling over different paths. In accordance with the present invention, a relatively high acoustic frequency is employed, i.e. in the order of between about 50 and about 200 kilocycles per second and the transmitting and receiving transducers are closely spaced to each other and to the borehole wall.

Accordingly, it is an object of the present invention to overcome the above-mentioned difficulties of conventional systems for examining formations traversed by a well bore.

A further object of the invention is to provide acoustic methods and apparatus for determining the angle and azimuthal direction of the dip of earth strata traversed by a borehole, while at the same time obtaining information relative to other characteristics of the earth formations.

Another object of the invention is to provide novel methods and apparatus for detecting fractures in the formations through which boreholes extend.

Briefly, the foregoing and other objects and advantages of the invention are attained by disposing at least three pads in laterally mutually spaced relation against the wall of a borehole, each pad carrying at least two electroacoustic transducers. The transducers in each pad are relatively closely spaced from each other, and according to one embodiment one of the transducers of each pad is supplied with pulsed energy of relatively high frequency, and the electrical signals generated by the other transducers in that pad are fed to electronic circuitry which determines the travel time and the attenuation of the acoustic energy through the surrounding formation. This information is supplied to display apparatus which produces logs of travel time and attenuation versus depth for each pad. These logs may be used to determine the porosity of or to detect fractures in the surrounding formation, and also the angle and azimuth of dip of fractures and beds may be readily determined.

In addition, because of the relatively high frequency of the acoustic waves, which permits relatively short spacing between the transducers on each pad, the apparatus according to the invention lends itself to determination of the quality of the cement bond between the column of cement and the casing of a completed well. Such cement bond logging is difficult to perform in a borehole surrounded by a very hard formation with conventional logging apparatus employing a relatively low frequency acoustic wave, inasmuch as the acoustic wave travelling through the formation arrives at the receiving transducer before the wave travelling through the casing in arrangements where there is a relatively large spacing between the transmitting and receiving transducers.

The features and advantages of the invention are more fully explained in the detailed description of the invention which follows, reference being made to the accompanying drawings wherein:

FIG. 1 is an elevational view of typical well logging apparatus according to the invention in position in a well bore in the earth;

FIG. 2 is an enlarged view taken along the lines 2—2 of FIG. 1 and looking in the direction of the arrows;

FIG. 3 is an enlarged elevational view of one of the transducer carrying pads of the apparatus of FIG. 1;

FIG. 4 is an enlarged elevational view of another transducer carrying pad of the apparatus of FIG. 1;

FIG. 7 is a block diagram of another electrical circuit included in the block diagram of FIG. 5.

Figure 5:
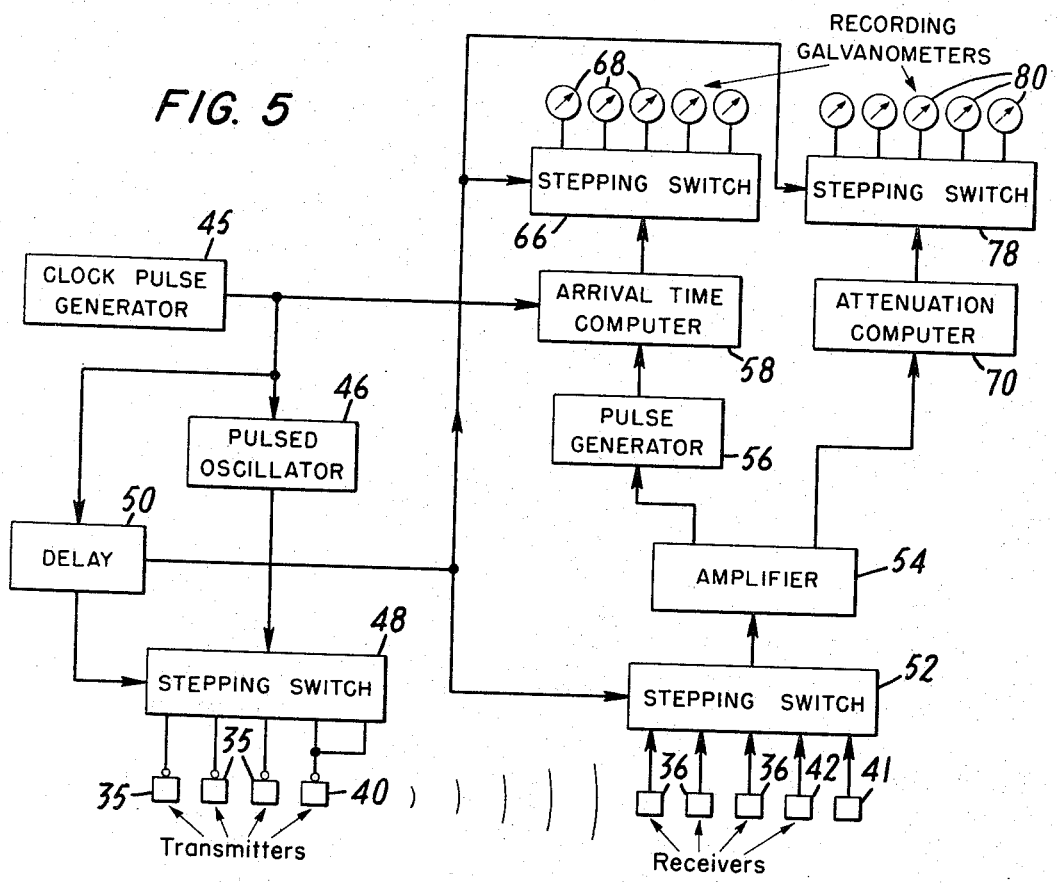
FIG. 5 is a block diagram of electrical circuitry included in the apparatus of FIG. 1.

In the embodiment of the invention shown by way of example in the drawings, a sonde 10 is disposed for movement along a borehole 11 which extends from the surface through earth formations 12 including a pair of fractures 13 and 14 and a dipping formation 15. The borehole 11 is filled with a drilling mud 17 which may be either of the water base or oil base variety. The sonde 10 is suspended for movement within the borehole by a multi-conductor armored cable 20 which is wound on a conventional winch (not shown) at the earth's surface. The electronic circuitry in the sonde 10 is powered through the multi-conductor cable 20 by a suitable power supply 21, and the information for the acoustic logs is transmitted from the sonde 10 through the cable 20 to appropriate display apparatus 22 for making a permanent recording of these logs.

The sonde 10 includes a portion 24 which houses the electronic equipment carried by the tool, while the remaining portions of the tool support a plurality of conventional centering members 25 and four transducer carrying pads 27, 28, 29 and 30. Also included within the portion 24 is conventional borehole inclinometer apparatus such as that disclosed in Patent No. 2,992,492, which issued July 18, 1961. In the representative embodiment of the apparatus illustrated, the centering members are disposed at the upper end of the tool while the transducer carrying pads are located at the bottom end thereof.

Each of the pads is mounted on the sonde 10 by a pair of support arms 32 and 33 which are pivotally mounted at each end to the pad and the sonde. The four pivot points are arranged to define a parallelogram, so that each pad maintains a predetermined orientation with respect to the longitudinal axis of the sonde. Suitable control means (not shown) are provided for extending each pad into engagement with the wall of the borehole 11, or for retracting the pad into the housing of the sonde 10. Furthermore, pairs of pads disposed on opposite sides of the sonde are coupled for simultaneous movement toward or away from the sonde. That is, the pads 27 and 29 are coupled for movement together, as are the pads 28 and 30, each pair of pads being capable of movement independently from the other pair. In this way, all four pads may be urged against the wall of the borehole whether the borehole be generally circular or oval in cross section, while the housing of the sonde remains substantially centered on the axis of the borehole. Suitable apparatus for so activating the pads is disclosed in the D. F. Saurenman et al. Patent No. 2,876,413, which issued Mar. 3, 1959. The centering members 25 are similarly retractable within the housing of the sonde, and the support apparatus therefore may be the same as that for the pads.

Each of the pads 27, 28 and 30 mounts a transmitting electroacoustical transducer 35, longitudinally spaced from which is disposed a receiving electroacoustical transducer 36. These transducers may include a piezoelectric element of lead zirconate-lead titanate ceramic, for example, and are discs of approximately 1 inch diameter for the relatively high frequencies employed. The spacing between the transducers 35 and 36 is in the range of approximately 3 to 12 inches. This spacing is greater than about 3 inches so that the acoustic wave which is refracted through the formation arrives at the receiver 36 before that through the thick mud cake along the wall of the borehole 11. The spacing is preferably less than about 12 inches so that the attenuation of the high frequency acoustic signal is not excessive, and also so that the pads are reasonably short permitting them to follow irregularities in the borehole wall.

The pad 29 mounts a transmitter 40 and two receivers 41 and 42. The receivers 41 and 42 are spaced from the transmitter 40 from 3 to 12 inches, and the dimensions and composition of these three transducers is identical to the transducers in the other three pads.

The transmitters 35 and receivers 36 of the pads 27, 28 and 30 and the transmitter 40 and receiver 41 of the pad 29 all provide logs of transit time and attenuation of the acoustic signal refracted through the formation adjacent the corresponding pad. The log provided by the receiver 42 of the pad 29 is used in conjunction with the log from the receiver 41 to provide a logging velocity computation, that is to provide an indication of the velocity of the sonde 10 through the borehole 11 as the above-mentioned transit time and attenuation logs are supplied by the four pads. This provides a more accurate determination of the depth of the sonde in the earth formations for the transit time and attenuation logs, inasmuch as there may be yoyoing or vertical oscillation of the sonde 10 as it is being pulled up through the borehole by the winch at the earth's surface. The depth correction is determined by measuring the spacing between similar portions of the logs from the receivers 41 and 42, inasmuch as the fixed spacing between these receivers is known. As the sonde is displaced through the borehole, the five transmitter-receiver combinations are sequentially operated by electrical circuitry now to be described.

Referring now to FIG. 5, a conventional clock pulse generator 45 supplies pulses at a repetition rate of 1 kilocycle per second, for example, to a pulsed oscillator 46 which supplies five to ten cycles of a signal of about 50 to 200 kilocycles per second. As the frequency is raised above 200 kilocycles per second, the acoustic signal is considerably attenuated and affected by irregularities in the borehole wall. On the other hand, as the frequency is lowered below 50 kilocycles per second, there is very poor resolution, i.e. very thin beds or fractures will not be detected.

The pulses from the pulsed oscillator 46 are supplied through a conventional electronic stepping switch 48 to one of the transmitters 35 and 40 in the four pads 27–30. The stepping switch 48 has five positions, and after each pulse is supplied to one of the transmitters, the switch is stepped to its next position by a stepping pulse supplied by a delay circuit 50 which is driven by the clock pulse generator 45. The delay 50 may be a conventional monostable multivibrator, and the stepping pulse is sufficiently delayed so that the stepping switch is not activated until the pulse supplied by the oscillator 46 has been transmitted by the appropriate one of the transmitters 35 and 40 to which the switch is then connected. Electronic stepping switches are well known to the art, and the switch 48 may include a conventional ring counter of five stages, each stage activating a conventional gating circuit. Two of the stages of the switch are coupled to the transmitter 40, so that for each complete cycle of the switch each of the transmitters 35 is pulsed once, while the transmitter 40 is pulsed twice.

The receivers 36, 41 and 42 in the four pads are coupled to another electronic stepping switch 52, the output of which drives a conventional amplifier 54. The stepping pulse for the stepping switch 52 is also obtained from the delay circuit 50, it being understood that sufficient delay is provided so that the acoustic wave is received from the desired receiver before that receiver is disconnected from the amplifier 54. Thus, if necessary the delay circuit 50 may comprise two cascaded monostable multivibrators, the output of the first of which is supplied to the stepping switch 48, while the output of the second multivibrator is supplied to the switch 52. Of course the switches 48 and 52 are initially adjusted to be at corresponding stages, so that the amplifier 54 receives the arrival at the receiver 36 from the transmitter 35 of the same pad, and the arrival at the receivers 41 and 42 from the two pulses generated by the transmitter 40. The output of the amplifier 54 activates a pulse generator 56, which supplies one input to an arrival time computer 58. Although the pulse generator 56 may be provided with a conventional threshold amplifier for discriminating against noise, the pulse generator 56 is preferably triggered at corresponding points on the acoustic waves supplied to the amplifier 54, regardless of the signal to noise ratio of these acoustic waves. For this purpose, one of the acoustic wave detection systems disclosed in the application No. 841,396, filed Sept. 21, 1959, by Robert B. Blizard, now Patent No. 3,237,153, entitled, "Detection of Acoustic Signals," assigned to the present assignee, may be employed. This detection system would be fed by the amplifier 54 and would drive the pulse generator 56.

Figure 6:
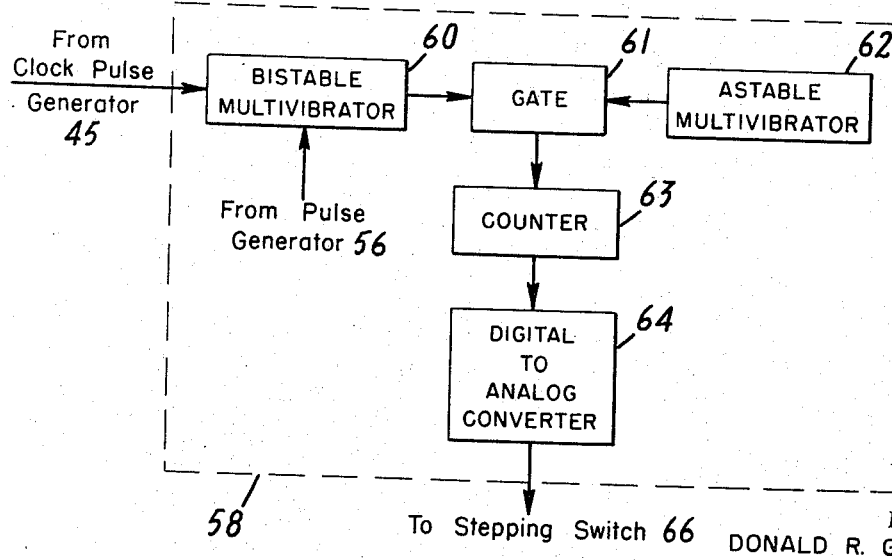
FIG. 6 is a block diagram of an electrical circuit included in the block diagram of FIG. 5.

The other input of the arrival time computer 58 is supplied by the clock pulse generator 45. This computer 58 measures the time delay between a given pulse generated by the clock pulse generator and the corresponding pulse from the pulse generator 56 generated in response thereto. The arrival time computer may be any suitable circuit known to the art for measuring the time delay between two successive pulses. FIG. 6 illustrates an illustrative form of such a computer. The first pulse (from the clock pulse generator 45) sets a conventional bi-stable multivibrator 60 to its first state, and the second pulse (from the pulse generator 56) resets this multivibrator to its second state. The multivibrator 60 thus generates a pulse, the duration of which equals the time delay between the two input pulses thereto. This pulse enables a conventional gate 61, which couples a conventional astable multivibrator 62 to a conventional binary counter 63. The count reached by the counter 63 is thus a measure of the transit time of the given acoustic wave between the corresponding transmitter and receiver of one of the pads, and this digital count is converted to an analog voltage signal by a conventional digital-to-analog converter 64.

The output of the arrival time computer 58 is fed through a stepping switch 66 to five galvanometers 68, the switch 66 being stepped by the output of the delay circuit 50 in synchronism with the switch 52. Each of the galvanometers 68 thus indicates the arrival time of an acoustic wave to a corresponding one of the receivers 36, 41 and 42. The stepping switch 66 and the galvanometers 68 are included in the display apparatus 22, and the galvanometers 68 may be of the mirror type to provide a permanent arrival time log on a photographic film, for example, as is well known to the art. Alternatively, or in addition, the display apparatus 22 may include a suitable computer which is supplied with the signals applied to the four galvanometers 68 corresponding to the receivers 36 and 41. Such a computer may be programmed to perform the necessary computations on the input data to determine the angle and azimuth of the dip of the earth strata in conjunction with the information supplied by the inclinometer in the sonde by comparing or averaging the results obtained from the different combinations of three out of the four receivers 36 and 41. In addition, the computer could be programmed to reject data from one of the four receivers which differed greatly from the expected value, due to borehole irregularities, noise, etc.

The output of the amplifier 54 is also supplied to an attenuation computer 70, which measures the amplitude of signals supplied thereto and thus indicates the attenuation suffered by the acoustic wave received from the corresponding one of the receivers 36, 41 and 42. An illustrative example of such an attenuation computer 70 is illustrated in FIG. 7. The amplifier 54 drives a conventional detector 72, the output of which is fed to a conventional low pass filter 73 which in turn feeds a storage capacitor 74. The storage capacitor smoothes the envelope waveform supplied thereto and drives one input of a differential amplifier 75, the other input of which is supplied by a reference amplitude supply 76. The operation of the differential amplifier 75 is controlled by a gating or reading pulse supplied by a pulse generator 77 which is driven by the pulse generator 56.

Alternative circuitry for computing the arrival time and attenuation is disclosed in the Louis Henry application Ser. No. 442,041, filed Mar. 23, 1965, and entitled, "Method and Apparatus for Examining Formations Adjacent the Walls of Boreholes," assigned to an affiliate of the present assignee.

The attenuation signal from the computer 70 is supplied through a stepping switch 78 to five galvanometers 80 corresponding to the five receivers 36, 41 and 42. The stepping switch 78 is stepped by the delay 50 in synchronism with the switch 52. The stepping switch 78 and the galvanometers 80 are included in the display apparatus 22 and provide permanent logs for the attenuation suffered by acoustic waves received by the receivers 36, 41 and 42 as discussed above in conjunction with the galvanometers 68. Similarly, the outputs of the stepping switch 78 may be supplied to a suitable computer for computing the angle and azimuth information of the dip of the earth strata.

The display apparatus 22 also provides four logs corresponding to the four pads 27–30 which provide more complete and detailed information regarding porosity, permeability and the like of the surrounding formation this can be obtained from conventional logging tools having only a single transmitter-receiver system.

It is to be understood that the output signal from the arrival time computer 58 and the attenuation computer 70 could be transmitted through the cable 20 to the display apparatus 22 in either analog or digital form. This the output of the arrival time computer 58 could be taken directly from the binary counter 63, and a conventional analog to digital converter could be driven by the differential amplifier 75, if it is desired to transmit the information up the cable in digital form. Of course, suitable digital to analog converters would be included in the display apparatus 22 as necessary.

According to another embodiment of the invention, wide band shock excited transducers would be employed for the transmitters 35 and 40. The electroacoustic transmitting transducers employed would preferably be those disclosed in Patent No. 3,138,219, which issued June 23, 1964, while the piezoelectric transducers mentioned above would be used for the receivers 36, 41 and 42. In this case the pulsed oscillator 46 would be omitted, the clock pulse generator 45 driving the transmitters 35 and 40 either directly or through another pulse generator.

As before, the outputs of the arrival time computer 58 and the attenuation computer 70 are transmitted up the cable 20 to the display apparatus 22. Alternatively, the output of the amplifier 54 may be transmitted up the cable 20, the remaining circuitry being located at the earth's surface. In this case, the transmitting transducers 35 and 40 should be so designed to have no significant energy in their amplitude spectra above about 120 kilocycles per second in order that the uphole transmission through a conventional multi-conductor cable be effective. This arrangement would permit the waveforms received by the receivers 36, 41 and 42 to be suitably displayed and monitored at the earth's surface. Again, the outputs of a conventional inclinometer would also be transmitted up the cable 20 to the display apparatus 22.

The apparatus according to the invention may be used to log either shear or compressional acoustic waves transmitted through the formation adjacent the borehole as desired. As is well known, shear waves are transmitted through a given formation at a considerably lower velocity than are compressional waves, and so suitable means must be provided for detecting or enhancing the shear wave arrival if it is not to be obscured by the prior arrival of compressional waves. This in itself is outside the scope of the present invention, but the technique may be employed of so disposing the transmitting transducer that an acoustic wave is directed to the borehole wall at such an angle of incidence thereto that the transmission of compressional waves into the formation is minimized while a maximum amount of shear waves are produced therein. This is described in greater detail in the above-mentioned application by Louis Henry, Ser. No. 442,041 filed Mar. 23, 1965.

Inasmuch as currents are not directed into the surrounding formation by an electrode array in the borehole, the apparatus according to the invention may be employed to determine the dip of strata from a borehole filled with a non-conducting oil base drilling mud or even from an empty borehole. In the latter case, the transducers may be disposed in pads filled with a fluid such as oil due to its good electrical insulation, for example.

In operation, the sonde 10 is first lowered below the portion of the formation which is to be logged with the centering members and the pads retracted. Then the centering members and the pads are extended to the borehole wall and the sonde is raised by the winch at a nominal speed of 1 foot per second for example. Inasmuch as the repetition rate of the clock frequency generator is 1 kilocycle per second and the five transmitting transducers are successively pulsed, the sampling rate of the illustrative embodiment is 200 cycles per second; that is indications of transit time and attenuation for each of the pads are provided approximately 200 times for each foot of the borehole traversed by the sonde. This provides very smooth attenuation and transit time logs, and it should be borne in mind that the sampling rate of 200 cycles per foot of borehole length has nothing whatever to do with the thickness of fractures or beds which the relatively high frequency acoustic wave of the present invention can detect in the formations.

When the apparatus is used to determine the dip of earth strata, a preliminary examination may be first made of the transit time or attenuation logs before these logs are correlated in the usual manner to provide the dip information, in order to distinguish between fractures or bed boundaries and irregularities in the borehole wall. Thus, a borehole irregularity would cause a deflection in either the attenuation or transit time log when either a transmitting or a receiving transducer is directly opposite the irregularity, while a bed boundary or a fracture would deflect these curves while such a feature was straddled by the transmitting and receiving transducers. In fact, such a feature should cause either log to deflect over a depth generally equal to the width of a transducer, approximately 1 inch for example, then remain at some deflected value until a depth is reached which differs by the transducer spacing, at which time the log would return to the original value over a depth equal to the width of a transducer.

While the fundamental novel features of the invention have been shown and described, it will be understood that various substitutions, changes and modifications in the form and details of the apparatus illustrated and its manner of operation, may be made by those skilled in the art without departing from the spirit of invention. All such variations and modifications, therefore, are included in the intended scope of the invention as defined by the following claims.

I claim:
1. A method of examining a formation through which a borehole extends, comprising the steps of transmitting from at least three laterally mutually spaced electroacoustical transmitting transducers pulses of acoustic energy from the borehole into the formation, generating by at least three laterally mutually spaced electroacoustical receiving transducers electrical signals in response to the acoustic energy received in the borehole from the formation, each electrical signal being generated in response to the pulses of acoustic energy transmitted by a different one of the transmitting transducers, comparing the amplitudes of the electrical signals with the amplitude of a reference signal to determine the attenuation suffered by the pulses of acoustic energy, measuring the transmission times of the pulses of acoustic energy between the transmitting and the receiving transducers, and correlating the attenuations and the transmission times to determine the character of the formation.

2. A method of determining the dip of earth formations traversed by a borehole, comprising the steps of disposing at least three pairs of electroacoustical transducers against the wall of the borehole in laterally mutually spaced relation, sequentially pulsing one of each pair of transducers with electrical energy to transmit pulses of acoustic energy into the formation, generating electrical signals by the other of each pair of transducers in response to the acoustic energy received in the borehole through the formation from the corresponding one of each pair, determining from the electrical signals the attenuation suffered by the pulses of acoustic energy in the formation adjacent each pair of transducers, and recording the attenuations determined at various depths along the borehole, whereby the dip of a formation may be determined by correlating the attenuation recordings corresponding to the pairs of transducers.

3. Apparatus for acoustic logging of earth formations surrounding a borehole, comprising a logging tool adapted to be moved through the borehole, at least three pairs of electroacoustic transducers mounted on the tool in laterally mutually spaced relation, means for sequentially pulsing one of each pair of transducers with electrical energy to transmit pulses of acoustic energy into the formations, the other of each pair of transducers being adapted to generate an electrical signal in response to the acoustic energy received in the borehole through the formations from the corresponding one of each pair, circuit means responsive to the electrical signals for determining the attenuation suffered by the pulses of acoustic energy in the formation adjacent each pair of transducers, means for recording the attenuations determined at various depths along the borehole, and a third electroacoustical transducer disposed in cooperative spaced relation to one of the pairs of transducers, the third transducer being adapted to generate an electrical signal in response to the acoustic energy received in the borehole through the formations from the one transducer of the one pair of transducers, whereby the character of the formations may be determined by correlating the attenuation recordings corresponding to the pairs of transducers and the velocity of the tool may be determined by comparing the attenuation recordings from the other and the third transducers of the one pair of transducers.

4. The method according to claim 2, including the step of determining from the electrical signals the transmission times of the acoustic energy between the one and the other of at least one pair of transducers at various depths along the borehole, whereby the dip of a formation may be determined by correlating the attenuation recordings corresponding to the pairs of transducers and other characteristics of the earth formations may be determined from the transmission times.

5. A method of determining the dip of earth formations traversed by a borehole, comprising the steps of disposing at least three pairs of electroacoustical transducers against the wall of the borehole in laterally mutually spaced relation, sequentially pulsing one of each pair of transducers with electrical energy to transmit pulses of acoustic energy into the formation, generating electrical signals by the other of each pair of transducers in response to the acoustic energy received in the borehole through the formation from the corresponding one of each pair, determining from the electrical signals the transmission times of the acoustic energy between the one and the other of each pair of transducers, and recording the transmission times determined at various depths along the borehole, whereby the dip of a formation may be determined by correlating the transmission time recordings corresponding to the pairs of transducers.

6. The method according to claim 5, including the step of determining from the electrical signals the attenuation suffered by the pulses of acoustic energy in the formation adjacent at least one pair of transducers at various depths along the borehole, whereby the dip of a formation may be determined by correlating the transmission time recordings corresponding to the pairs of transducers and other characteristics of the earth formations may be determined from the attenuations.

References Cited

UNITED STATES PATENTS

| | | | |
|---|---|---|---|
| 2,427,950 | 9/1947 | Doll | 324—10 |
| 2,963,641 | 12/1960 | Nanz | 324—13 |
| 3,149,304 | 9/1964 | Sommers | 340—18 |
| 3,251,221 | 5/1966 | Vogel et al. | 181—.5 X |
| 3,257,639 | 6/1966 | Kokesh | 340—18 |

BENJAMIN A. BORCHELT, *Primary Examiner.*

R. M. SKOLNIK, *Assistant Examiner.*